United States Patent Office 3,159,666
Patented Dec. 1, 1964

3,159,666
TOXIC ARYLSULFONYL ALKENENITRILES
Samuel Allen Heininger and Gail H. Birum, Dayton, Ohio, assignors to Monsanto Company, a corporation of Delaware
No Drawing. Filed May 1, 1957, Ser. No. 656,200
7 Claims. (Cl. 260—465)

This invention relates to novel arylsulfonyl alkenenitriles, to methods for the control of microorganisms using these nitriles and to certain novel compositions comprising these nitriles which inhibit the growth of microorganisms such as bacteria and fungi.

The novel compounds of the invention are arylsulfonyl alkenenitriles having the formula

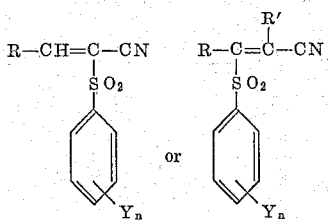

wherein R and R' are selected from the class consisting of hydrogen or a hydrocarbon radical free of aliphatic unsaturation and containing from 1 to 6 carbon atoms, and R and R' can be the same or different. Y is selected from the class consisting of chlorine, bromine, iodine, fluorine, hydrogen and alkyl radicals having from 1 to 6 carbon atoms, and $n$ represents an integer from 1 to 5. An examination of each of these formulas above will indicate that the compounds can exist in both the cis- and trans-isomeric forms. It is intended that both the cis- and trans- forms of each of these structures be covered by the above formulas.

It is an object of this invention to provide new compounds which are arylsulfonyl alkenenitriles.

It is another object of this invention to provide new and effective biological toxicant compositions which have as an active ingredient therein an arylsulfonyl alkenenitrile.

It is a further object of the invention to provide a method of inhibiting the growth of undesired microorganisms by the application of the inventive arylsulfonyl alkenenitriles to these microorganisms.

These and other objects of the invention will become apparent as a detailed description of the invention proceeds.

There are shown below a number of specific new compounds of the invention. It is not intended that this be a complete listing of all the compounds of the invention, but that it merely be illustrated thereof. The following are a listing of a number of the arylsulfonyl alkenenitriles:

3-(phenylsulfonyl)acrylonitrile, 2-(phenylsulfonyl)acrylonitrile;
3-(2-chlorophenylsulfonyl)acrylonitrile, 3-(3-chlorophenylsulfonyl)acrylonitrile, 3-(4-chlorophenylsulfonyl)acrylonitrile, 2-(2-chlorophenylsulfonyl)acrylonitrile, 2-(3-chlorophenylsulfonyl)acrylonitrile, 2-(4-chlorophenylsulfonyl)acrylonitrile;
3-(2,4-dichlorophenylsulfonyl)acrylonitrile, 2-(2,4-dichlorophenylsulfonyl)acrylonitrile;
3-(pentachlorophenylsulfonyl)acrylonitrile, 2-(pentachlorophenylsulfonyl)acrylonitrile, etc.

An examination of the above-listed compounds only as to the nuclear substitution indicate that not everyone of the possible novel compounds of the invention is named specifically. For example, only one of the dichloro isomers is named; no trichloro- and no tetrachloro- compounds are named. Nevertheless, it is intended to cover all these compounds as well as others covered by the general formula but not specifically named.

The following is a non-limiting listing of a number of the new bromoarylsulfonyl acrylonitriles:

3-(2-bromophenylsulfonyl)acrylonitrile, 3-(3-bromophenylsulfonyl)acrylonitrile, 3-(4-bromophenylsulfonyl)acrylonitrile, 2-(2-bromophenylsulfonyl)acrylonitrile, 2-(3-bromophenylsulfonyl)acrylonitrile, 2-(4-bromophenylsulfonyl)acrylonitrile;
3-(2,4-dibromophenylsulfonyl)acrylonitrile, 2-(2,4-bromophenylsulfonyl)acrylonitrile;
3-(pentabromophenylsulfonyl)acrylonitrile, 2-(pentabromophenylsulfonyl)acrylonitrile, etc.

It is also intended to cover under the general formula compounds containing both bromo- and chloro- substituents on the phenylsulfonyl group and the following are a non-limiting list thereof:

3-(2-bromo-4-chlorophenylsulfonyl)acrylonitrile, 2-(2,4-dibromo-3-chlorophenylsulfonyl)acrylonitrile, etc.

Some of the novel compounds of the invention of the iodophenylsulfonyl acrylonitrile type are shown in the following nonlimiting list:

3-(2-iodophenylsulfonyl)acrylonitrile, 2-4-iodophenylsulfonyl)acrylonitrile, 3-(2,4-diiodophenylsulfonyl)acrylonitrile, 2-(3,4-diiodophenylsulfonyl)acrylonitrile, 3-(2,3-diiodophenylsulfonyl)acrylonitrile, 2-(2-iodo-4-chlorophenylsulfonyl)acrylonitrile, etc.

For a non-limiting list of the fluorophenylsulfonyl acrylonitriles, the following are named:

3-(4-fluorophenylsulfonyl)acrylonitrile, 2-(2-fluoro-3-iodo-4-chlorophenylsulfonyl)acrylonitrile, etc.

The alkylphenylsulfonyl acrylonitriles are shown specifically in the following non-limiting lists:

2-(4-tolylsulfonyl)acrylonitrile, 3-(3,5-diethylphenylsulfonyl)acrylonitrile, 2-(2-methyl-4-chlorophenylsulfonyl)acrylonitrile, 3-(2,4-dichloro-5-ethylphenylsulfonyl)acrylonitrile, 2-(4-n-hexyphenylsulfonyl)acrylonitrile, etc.

Referring now to the general formulas above of the inventive compounds where R and R' are other than hydrogen, the following non-limiting list exemplary of compounds in which R or R' may be methyl, phenyl, ethyl, etc., is provided:

2-(4-chlorophenylsulfonyl)crotononitrile, 3-(2,4,5-trichlorophenylsulfonyl)cinnamonitrile, 3-(4-tolylsulfonyl)-2-ethylacrylonitrile, 3-(4-chlorophenylsulfonyl)-2-methylacrylonitrile, etc.

Other componds which are not covered by the general formula above but which can be prepared in a similar manner are the naphthylsulfonyl acrylonitriles, e.g., 2-(β-naphthylsulfonyl)acrylonitrile, 2-(β-chloro-α-naphthylsulfonyl)acrylonitrile, etc.

The novel compounds of the invention are normally prepared by the dehydrohalogenation of the corresponding arylsulfonyl haloalkanenitrile by heat and/or the employment of a basically reacting material such as triethylamine, sodium or potassium hydroxide, pyridine, etc., to aid the dehydrohalogenation. However, another method of preparation of the novel α-arylsulfonyl acrylonitriles is by the reaction of formaldehyde in the presence of piperidine with the corresponding arylsulfonyl acetonitrile. The arylsulfonyl haloalkane nitriles can be prepared by the controlled oxidation of the corresponding arylthio haloalkane nitrile using $KMnO_4$, $CrO_3$, $H_2O_2$ in acetic acid, and similar oxidizing agents, as described in detail in our copending application, Serial No. 656,199, filed of even date, and now abandoned. The arylthio haloalkane nitriles can be readily prepared by a variety of methods including the addition of alkyl-, halo-, or unsubstituted arylsulfenyl chlorides or bromides to acrylonitrile to give mixtures of the corresponding 3 or 2-halo- 2 or 3-(phenylthio)propionitriles, the addition of alkyl- or halo-substituted thiophenols to alpha haloacrylonitriles to give 2-halo-3-(phenylthio)propionitriles or by reaction of sodium or potassium alkyl- or halo-substituted thiophenolates with 2,3-dichloropropionitrile. Also other methods of preparation of these arylthio haloalkanenitriles will be obvious to those skilled in the art in view of the teachings herein.

The invention will be more clearly understood from the following detailed description of specific examples thereof:

*Example 1*

This is an example of the preparation of 3-(4-chlorophenylsulfonyl)acrylonitrile.

This example is described starting with the preparation of the reaction product of acrylonitrile and p-chlorobenzenesulfenyl chloride. A sample of 374 g. (2.09 moles) of p-chlorobenzene sulfenyl chloride was placed in a flask with 300 ml. of dry benzene and to it was slowly added 159 g. (3.0 moles) of acrylonitrile. The flask and contents were heated to 50° C. at which point the evolution of HCl was noted, so the heating was discontinued. An exothermic reaction carried the temperature up to 60° C. in ten or fifteen minutes which caused more HCl evolution. The flask contents were cooled back to 50° C., but the reaction mixture remained exothermic raising the temperature to 55° C. again, at which time both the reaction and the HCl evolution seemed to subside. The reaction mixture was then heated to reflux and refluxed for 1½ hours after which time 100 ml. of glacial acetic acid was added to the reaction mixture, and the red color of the contents of the flask quickly changed to a brownish yellow. The flask contents were refluxed for an additional ½ hour after which time the solvent was stripped from the reaction mixture. The reaction mixture was then distilled and after first taking a small forerun, there was obtained a distillate comprising at least two fractions, weighing 307 g. (63.5% yield). Considerable decomposition was evident during the distillation judging by the HCl evolved.

The distillate product described above apparently contains a mixture of saturated and unsaturated components. A sample of 46.4 g. (0.2 mole) of the distillate was placed in a flask to which was added 200 ml. of glacial acetic acid at a temperature of 50–60° C. Then 90 g. of 30% hydrogen peroxide (0.8 mole of $H_2O_2$) was added slowly to the reaction mixture. The reaction mixture became lighter in color and a somewhat exothermic reaction took place near the end of the addition with the temperature rising to 70° C. Cooling was employed to reduce and maintain the temperature between 50–60° C. After all the $H_2O_2$ was in and the reaction had subsided, the reaction mixture was stirred at 40–50° C. for 1.5 hours. Then the contents of the flask were poured into 1.5 l. of ice-water, and an oil product settled out. This product was separated and dissolved in ethanol, decolorized with charcoal and allowed to crystallize in an ice bath giving white needles, M.P. 90.5–91.5° C., 12 g. A sample of these crystals was submitted for elemental analysis giving the following results:

|   | Found, percent | Calcd. for $C_9H_7Cl_2NO_2S$, percent |
|---|---|---|
| C | 41.02 | 40.95 |
| H | 3.07 | 2.67 |
| N | 5.39 | 5.3 |
| S | 12.16 | 12.1 |
| Cl | 26.73 | 26.8 |

This product was shown to be 2-chloro-3-(4-chlorophenylsulfonyl)-propionitrile.

A sample of 1.3 g. (0.005 mole) of the sulfone prepared immediately above was dissolved in a mixture of 20 ml. of ethyl alcohol and 50 ml. of ethyl ether. To the solution was added 1.0 g. (0.01 mole) of triethylamine. A white solid soon precipitated and after the flask contents had stood for 1 hour in an ice bath the solid was filtered from the reaction mixture giving 0.6 g. (87.5%) of the HCl salt of triethylamine. Most of the ether was evaporated from the filtrate, and upon cooling, there was obtained 0.36 g. of a white solid. Recrystallization from an ethanol-water mixture gave white plates, M.P. 138–139° C. An elemental analysis of the purified solid product gave the following results:

|   | Found, percent | Calcd. for $C_9H_6ClNO_2S$, percent |
|---|---|---|
| C | 47.55 | 47.5 |
| H | 2.85 | 2.66 |
| Cl | 15.14 | 15.6 |
| N | 6.09 | 6.16 |
| S | 13.96 | 14.1 |

*Example 2*

This example illustrates an alternate preparation of 3-(4-chlorophenylsulfonyl)acrylonitrile.

To a solution of 43.3 g. (0.3 mole) of p-chlorothiophenol in 75 ml. of dioxane containing 5 ml. of 50% aqueous chlorine (2-hydroxyethyltrimethylammonium hydroxide) was added 26.3 g. (0.3 mole) of α-chloroacrylonitrile. There was an immediate exothermic reaction during the addition, and the reaction temperature was held at 35–40° C. by cooling. After addition was complete, the reaction mixture was stirred for ½ hour at 30–40° C., and then poured into ice water. The oil which separated was extracted with ether, dried and the ether removed by evaporation. On distillation there was collected 55 g. (79% yield) of 3-(4-chlorophenylthio)-2-chloropropionitrile, as a yellow liquid, B.P. 147–148° C./0.6 mm., $n_D^{25}$ 1.5885, analyzing correctly for $C_9H_7Cl_2NS$ and having an α-chloro structure by infrared analysis. On standing, the oil solidified. Recrystallization from ethanol gave a white solid, M.P. 39–40° C.

The next step in the preparation of the desired compound is the oxidation of the 3-(4-chlorophenylthio)-2-chloropropionitrile to 3-(4-chlorophenylsulfonyl)-2-chloropropionitrile using $KMnO_4$ as the oxidizing agent. A sample of 4.6 g. (0.02 mole) of the 3-(4-chlorophenylthio)-2-chloropropionitrile was dissolved in 200 ml. of glacial acetic acid, and a solution (not quite complete) of $KMnO_4$ (6 g.) in 600 ml. of water was added slowly. The color of the reaction mixture developed and turned muddy brown. When all the $KMnO_4$ was in, the reaction mixture was allowed to stand for 10–15 minutes; then sodium bisulfite was added with stirring until decolorization of the reaction mixture occurred. Ice and water were added to the slightly cloudy colorless reaction mixture to make up a 1500 ml. solution. A white solid precipitated from the chilled solution and was filtered therefrom and dried. It weighed 4.1 g. (79%), M.P. 91–92° C. The solid was recrystallized from ethanol-water solution giving 3.9 g. of white needles, M.P. 92–93° C. This material is 2-chloro-3-(4-chlorophenylsulfonyl)propionitrile in a slightly purer form than was obtained in Example 1.

A sample of 1.3 g. of this sulfone was dissolved in 100 ml. of ethyl ether. To this solution was added 1.0 g. of triethylamine, and immediately a precipitate appeared of triethylamine hydrochloride. This white precipitate was filtered from the reaction mixture and the solvent removed under vacuum. The residue was dissolved in hot ethyl alcohol, decolorized with charcoal upon cooling, gave a 0.7 g. of white needles, M.P. 141.5–142° C. An elemental analysis of these white needles give the following results:

|  | Found, percent | Calcd. for $C_9H_6ClNO_2S$, percent |
|---|---|---|
| C | 48.18 | 47.5 |
| H | 3.09 | 2.66 |
| Cl | 15.54 | 15.6 |
| N | 6.52 | 6.16 |
| S | 15.87 | 14.1 |

A mixed melting point between the dehydrohalogenated sulfone of this example and the dehydrohalogenated sulfone of Example 1 showed no melting point depression indicating that these materials are identical, namely 3-(4-chlorophenylsulfonyl)acrylonitrile.

Example 3

This example describes the preparation of 3-(4-tolylsulfonyl)acrylonitrile by reaction of the sodium salt of 4-toluenethiol with 2,3-dichloropropionitrile, followed by oxidation and dehydrochlorination.

To a solution of 27.8 g. of sodium hydroxide in 400 ml. of water is added 87 g. (0.7 mole) of 4-toluenethiol. This aqueous solution is then combined with 86 g. (0.7 mole) of 2,3-dichloropropionitrile and the mixture stirred vigorously for 4 hours, with cooling to keep the temperature below 35° C. The product is extracted into ether, washed once with water, dried and the solvent removed. Distillation of the residue gave an 87% yield of a 4-tolylthio-chloropropionitrile, B.P. 141–144° C./1.2 mm., $n_D^{25}$ 1.5680, believed to be predominantly the α-chloro-β-tolylthio isomer. Elemental analysis gave the following results:

|  | Found, percent | Calcd. for $C_{10}H_{10}ClNS$, percent |
|---|---|---|
| Cl | 14.1 | 16.8 |
| N | 6.81 | 6.62 |
| S | 15.7 | 15.15 |

Oxidation of 84.6 g. of this product by hydrogen peroxide in glacial acetic acid by the method described in Example 1, gave 97 g. of white solid, M.P. 82–83° C. upon recrystallization from ethanol. Elemental analysis of this product, 2-chloro-3-(4-tolylsulfonyl)propionitrile, gave the following results:

|  | Found, percent | Calcd. for $C_{10}H_{10}ClNO_2S$, percent |
|---|---|---|
| C | 48.9 | 49.3 |
| H | 4.6 | 4.1 |
| Cl | 14.1 | 14.6 |
| N | 5.4 | 5.8 |
| S | 13.2 | 13.1 |

Dehydrochlorination of this 2-chloro-3-sulfonylpropionitrile with triethylamine by the procedure of Example 1 gave 81% of 3-(tolylsulfonyl)acrylonitrile, white needles from ethanol, M.P. 131–132° C.

|  | Found, percent | Calcd. for $C_{10}H_9NO_2S$, percent |
|---|---|---|
| C | 58.0 | 58.0 |
| H | 4.4 | 4.4 |
| N | 6.7 | 6.8 |
| S | 15.6 | 15.5 |

Example 4

This example illustrates the preparation of 3-(phenylsulfonyl)acrylonitrile.

2-chloro-3-(phenylthio)propionitrile was prepared by the choline-catalyzed addition of thiophenol to α-chloroacrylonitrile according to the procedure of Example 2, to give an 85% yield, M.P. 115–116° C./03 mm., $n_D^{25}$ 1.5762.

|  | Found, percent | Calcd. for $C_9H_8ClNS$, percent |
|---|---|---|
| C | 55.29 | 54.7 |
| H | 4.1 | 4.1 |
| Cl | 17.4 | 18.0 |
| N | 6.74 | 7.1 |
| S | 16.8 | 16.2 |

Oxidation to the corresponding sulfone was accomplished by the method of Example 1, using hydrogen peroxide in glacial acetic acid, to give 62% of white needles (from ethanol) of 2-chloro-3-(phenylsulfonyl)propionitrile, M.P. 105–106° C.

|  | Found, percent | Calcd. for $C_9H_8ClNO_2S$, percent |
|---|---|---|
| C | 46.9 | 47.1 |
| H | 3.5 | 3.5 |
| Cl | 15.3 | 15.5 |
| N | 5.8 | 6.1 |
| S | 14.2 | 13.9 |

Dehydrochlorination by triethylamine as described in Example 1 gave 87% of 3-(phenylsulfonyl)acrylonitrile, as white needles, M. P. 102–103° C.

|  | Found, percent | Calcd. for $C_9H_7NO_2S$, percent |
|---|---|---|
| C | 56.2 | 56.0 |
| H | 3.8 | 3.7 |
| N | 7.4 | 7.3 |
| S | 17.1 | 16.6 |

Example 5

This example illustrates the preparation of 2-(4-chlorophenylsulfonyl)acrylonitrile.

A mixture of 43.1 g. (0.2 mole) of 4-chlorophenylsulfonylacetonitrile (M.P. 167–168° C., prepared from sodium 4-chlorothiophenate and chloroacetonitrile, followed by oxidation with 30% $H_2O_2$), 6.0 g. of paraformaldehyde, 6 ml. of piperidine and 200 ml. of benzene was heated to reflux and the water evolved was collected in a Dean-Stark trap. After 5 hours, 11 ml. of water was collected. The red solution was then concentrated under vacuum, leaving a dark red mass. To this is added 2.0 g. of phosphorus pentoxide and 0.5 g. of hydroquinone and the whole is subjected to a high temperature vacuum distillation at 0.5–2.0 mm. pressure to give a low yield of the desired monomeric 2-(4-chlorophenylsulfonyl)acrylonitrile.

Example 6

For the evaluation of the bacteriostatic and fungistatic effects of these new compounds, the product of Example 2 was chosen, namely, the compound 3-(4-chlorophenylsulfonyl)acrylonitrile. This compond was mixed in predetermined concentrations with hot, sterile agar which was subsequently poured into Petri dishes, cooled and allowed to harden. Nutrient agar containing the test compounds was then inoculated with the bacteria Micrococcus pyogenes var. aureus and Salmonella typhosa and incubated for 2 days at 37° C., and Sabouraud's dextrose agar containing the test compounds were inoculated with the fungus organism Aspergillus niger and incubated for 5 days at 20° C. These tests showed inhibition of the Micrococcus pyogenes at down to 10 parts per million concentration of the compound tested, and inhibition of the growth of the Salmonella typhosa and the Aspergillus niger down to 1 part per million concentration of the compound tested. Thus, it will be seen that these materials are extremely potent bacteriostats and fungistats. Usually, these novel compounds will be applied as bacteriostats or fungistats at concentrations in the range of 0.0001% to 1.0%, preferably 0.001% to 0.1%, suspended, dispersed or dissolved in an inert carrier.

To illustrate the wide field of usage of the present bacteriostats and fungistats, there is appended below a table showing minimum concentrations of 3-(4-chlorophenylsulfonyl)acrylonitrile inhibiting growth of various test organisms.

The new compounds of this invention may be applied directly to the microorganisms, the growth of which it is wished to inhibit or may be compounded in emulsion or other form within an inert carrier for application. The compounds of the invention may also be useful active ingredients in nematocidal, insecticidal and herbicidal compositions and applications.

Although the invention has been described in terms of specified embodiments which are set forth in considerable detail, it should be understood that this is by way of illustration only, and that the invention is not necessarily limited thereto, since alternative embodiments will become apparent to those skilled in the art in view of the disclosure. Accordingly, modifications are contemplated which can be made without departing from the spirit of the described invention or the scope of the appended claims.

This application is a continuation-in-part of application Serial No. 641,477, filed February 21, 1957, and now U.S. Patent 2,919,225.

What is claimed is:

1. An arylsulfonyl alkenenitrile selected from the class consisting of compounds of the formula

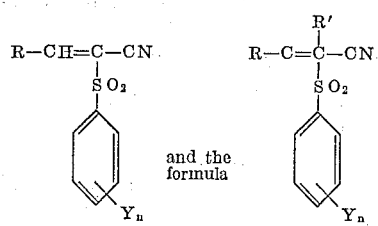

and the formula wherein R and R' are selected from the class consisting of hydrogen and hydrocarbon radicals free of aliphatic unsaturation and containing from 1 to 6 carbon atoms, Y is selected from the class consisting of chlorine, bromine, iodine, fluorine, hydrogen and alkyl radicals having from 1 to 6 carbon atoms, and $n$ is an integer from 1 to 5.

2. An arylsulfonyl alkenenitrile of the formula

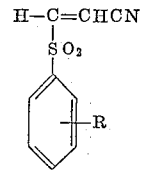

wherein R is alkyl having from 1 to 6 carbon atoms.

3. 3-(tolylsulfonyl)acrylonitrile.
4. 3-(4-tolylsulfonyl)acrylonitrile.
5. 3-(phenylsulfonyl)acrylonitrile.
6. An arylsulfonyl alkenenitrile of the formula

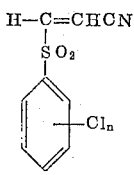

wherein $n$ is an integer from 1 to 5.

7. 3-(4-chlorophenylsulfonyl)acrylonitrile.

References Cited in the file of this patent

UNITED STATES PATENTS

| | | |
|---|---|---|
| 2,435,552 | Bruson | Feb. 3, 1948 |
| 2,485,095 | Harris et al. | Oct. 18, 1949 |
| 2,743,210 | Jones et al. | Apr. 24, 1956 |
| 2,788,360 | Westfahl | Apr. 9, 1957 |

FOREIGN PATENTS

| | | |
|---|---|---|
| 713,811 | Germany | Nov. 15, 1941 |

| Bacteriostatic Test Organism | Lowest P.p.m. Inhibiting Growth | Fungistatic Test Organism | Lowest P.p.m. Inhibiting Growth |
|---|---|---|---|
| *Micrococcus pyogenes* var. *aureus* ATCC 6538 | 1 | *Aspergillus niger* IPC 144 | 10 |
| *Streptococcus faecalis* ATCC 9790 | 1 | *Penicillium expansum* IPC 126 | 1 |
| *Bacillus cereus* var. *mycoides* IPC 509 | 1 | *Fomes annosus* FPL 517 | 1 |
| *Corynebacterium diphtheriae* ATCC 296 | 1 | *Memnoniella echinata* ATCC 9597 | 1 |
| *Bacterium ammoniagenes* ATCC 6871 | 1 | *Hormiscium gelatinosum* FPL 595 | 1 |
| *Mycobacterium phlei* (St. Louis) | 1 | *Trichoderma* sp. T-1 ATCC 9645 | 10 |
| *Escherichia coli* ATCC 11229 | 10 | *Chaetomium globosum* USDA 1032.4 | 1 |
| *Aerobacter aerogenes* IPC 500 | 10 | *Ceratostomella pilifera* ATCC 8713 | 1 |
| *Erwinia atroseptica* ATCC 7404 | 10 | *Aspergillus oryzae* ATCC 10.196 | 10 |
| *Proteus vulgaris* (Lambert) | 1 | *Cladosporium herbarum* ATCC 6506 | 1 |
| *Salmonella typhosa* (Hopkins strain) | 1 | *Alternaria tenuis* ATCC 11612 | 1 |
| *Pseudomonas aeruginosa* QMB 1468 | 100 | *Myrothecium verrucaria* ATCC 9095 | 1 |
| *Bacillus subtilis* (Lambert) | 1 | *Stemphylium sacrinaeforme* (U. of Ill.) | 1 |
| *Pseudomonas phaseolicola* USDA | 1 | *Monolinia fructicola* (U. of Ill.) | 1 |
| *Xanthomas phaseoli* USDA | 10 | | |

UNITED STATES PATENT OFFICE
CERTIFICATE OF CORRECTION

Patent No. 3,159,666                      December 1, 1964

Samuel Allen Heininger et al.

It is hereby certified that error appears in the above numbered patent requiring correction and that the said Letters Patent should read as corrected below.

Column 1, line 71, for "specifiually" read -- specifically --; column 4, line 31, for "chlorine" read -- choline --; line 74, after "charcoal" insert -- and --; column 5, line 60, for "3-(tolylsulfonyl)acrylonitrile" read -- 3-(4-tolylsulfonyl)acrylonitrile --; column 6, line 61, for "compond" read -- compound --; column 7, lines 52 to 60, the right-hand formula should appear as shown below instead of as in the patent:

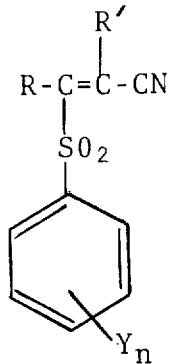

Signed and sealed this 1st day of June 1965.

(SEAL)
Attest:

ERNEST W. SWIDER  
Attesting Officer

EDWARD J. BRENNER  
Commissioner of Patents